(12) United States Patent
Nadeau

(10) Patent No.: US 10,940,744 B1
(45) Date of Patent: Mar. 9, 2021

(54) TRUCKBED COVERING APPARATUS

(71) Applicant: Dana Nadeau, Kilauea, HI (US)

(72) Inventor: Dana Nadeau, Kilauea, HI (US)

( * ) Notice: Subject to any disclaimer, the term of this patent is extended or adjusted under 35 U.S.C. 154(b) by 0 days.

(21) Appl. No.: 16/734,066

(22) Filed: Jan. 3, 2020

(51) Int. Cl.
*B60J 7/16* (2006.01)
*B60J 5/10* (2006.01)

(52) U.S. Cl.
CPC ............. *B60J 7/1607* (2013.01); *B60J 5/108* (2013.01); *B60J 7/1621* (2013.01)

(58) Field of Classification Search
CPC ......... B60J 7/1607; B60J 7/1621; B60J 5/108
USPC ........................................ 296/100.06, 100.09
See application file for complete search history.

(56) References Cited

U.S. PATENT DOCUMENTS

| | | | |
|---|---|---|---|
| 3,420,570 A * | 1/1969 | Kunz | B62D 33/08 296/100.06 |
| 4,261,611 A * | 4/1981 | Barry | B60J 7/141 296/100.07 |
| 5,509,709 A | 4/1996 | Carroll | |
| 5,544,798 A * | 8/1996 | Shumate | B60P 3/1033 211/206 |
| 5,564,773 A | 10/1996 | Lapsley et al. | |
| 5,868,453 A | 2/1999 | Steigner | |
| 6,386,412 B1 * | 5/2002 | Konechne | B60R 7/04 224/275 |
| 6,802,553 B1 | 10/2004 | Sanders | |
| 7,488,027 B2 | 2/2009 | Liao | |
| 8,007,024 B2 | 8/2011 | Kealy | |
| 2016/0039275 A1 * | 2/2016 | Rohr | B62D 33/02 296/100.06 |

\* cited by examiner

*Primary Examiner* — Joseph D. Pape
(74) *Attorney, Agent, or Firm* — Dale J. Ream

(57) ABSTRACT

A truckbed apparatus for a pickup truck includes a framework having first and second side rails extending along the first and second bed rails of the truck. The framework includes opposed front and rear end rails extending between proximal and distal ends of the first and second side rails, respectively. A center support rail has front and rear ends operatively attached to center portions of the front and rear rails, respectively, the center support rail being parallel and intermediate to the side rails, respectively. The apparatus includes first and second door assemblies that include first and second doors each having an inner edge pivotally coupled to the center support rail and an outer edge opposite the inner edge, respectively, Each door is movable between a closed configuration in which the respective outer edge bears against a respective side rail and an open configuration displaced upwardly from the side rail.

14 Claims, 9 Drawing Sheets

TRUCKBED COVERING APPARATUS

BACKGROUND OF THE INVENTION

This invention relates generally to truck-mounted cargo hauling frameworks and, more particularly, to a truckbed covering apparatus having structures both for covering or sheltering cargo from weather elements and for supporting other cargo at positions elevated from the truckbed itself and above the sheltered cargo.

Truck owners and operators use various cargo hauling and security devices mounted in the bed portion of their truck. For example, a locking tool box may be mounted immediately behind the cab of the truck and may include one or more doors that open pivotally and may be locked closed to protect small tools inside from being stolen as well as to protect them from weather events. Such lockable tool boxes, while handy, are not useful for storing or protecting larger items and, by themselves, do not provide reliable support to additional cargo being stored on top of the pivotal doors. Further, cargo racks drop into the bed wells of a truck and extend upwardly for carrying cargo such as ladders and the like.

Although presumably effective for their intended purposes, there is still a need for a truckbed covering apparatus that provides one or more compartments that extend the entire longitudinal length of a truckbed for shielding both small and large cargo from weather elements as well as to support stowage of cargo above the sheltered cargo.

Therefore, it would be desirable to have a truckbed covering apparatus for stowing cargo in a position shielded from weather elements, whether that cargo is equipment, tools, or other cargo being transported. Further, it would be desirable to have a truckbed cargo cover apparatus having a pair of doors that extend the entire longitudinal length of a truckbed and that open pivotally to give access to the otherwise covered stowage area of the entire bed portion. In addition, there is also a need for a truckbed covering apparatus having both front and rear load assemblies that rise above the cab portion of a truck for carrying tall cargo and cargo that may be longer than the truck bed.

SUMMARY OF THE INVENTION

A truckbed cover apparatus according to the present invention for attachment to a pickup truck having a bed portion with first and second laterally spaced apart and parallel bed rails, the truckbed cover apparatus includes a framework having a first side cover rail operatively coupled to the first bed rail of the pickup truck and a second side cover rail operatively coupled to the second bed rail of the pickup truck. The framework includes a front end cover rail coupled to and extending between proximal ends of the first and second side cover rails, respectively, and a rear end cover rail coupled to and extending between distal ends of the first and second side cover rails, respectively. The framework also includes a center support rail having front and rear ends operatively attached to center portions of the front and rear cover rails, respectively, the center support rail being parallel and intermediate to the first and second side cover rails, respectively.

The cover apparatus includes a first door assembly that includes a first door having a first inner edge pivotally coupled to the center support rail and a first outer edge opposite the first inner edge, the first door being movable between a closed configuration in which the first outer edge bears against the first side cover rail and an open configuration in which the first outer edge is displaced upwardly from the first side cover rail. And, the cover apparatus includes a second door assembly that includes a second door having a second inner edge pivotally coupled to the center support rail and a second outer edge opposite the second inner edge, the second door being movable between a closed configuration in which the second outer edge bears against the second side cover rail and an open configuration in which the second outer edge is displaced upwardly from the second side cover rail.

Therefore, a general object of this invention is to provide a truckbed cover apparatus for storing and transporting cargo using the bed of a pickup truck.

Another object of this invention is to provide the truckbed cover apparatus, as aforesaid, having a pair of doors that each extend an entire longitudinal extent of the truckbed that each open pivotally to give access to a stowage area for cargo and that covers and shields stowed cargo from weather elements.

Still another object of this invention is to provide the truckbed cover apparatus, as aforesaid, having both front and rear load assemblies for receiving and securing cargo that may be taller than a cab of the pickup truck.

Yet another object of this invention is to provide the truckbed cover apparatus, as aforesaid, having containment structures extending upwardly from outer edges of the pivotal doors themselves for containing lateral movement of cargo mounted atop the doors.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is an isolated view on an enlarged scale taken from FIG. 3a;

FIG. 6a is a side view of the truckbed cover apparatus as in FIG. 3a.

FIG. 6b is a sectional view taken along line 6b-6b of FIG. 6a;

DESCRIPTION OF THE PREFERRED EMBODIMENT

A truckbed cover apparatus according to the present invention will now be described in detail with reference to FIGS. 1a to 6e of the accompanying drawings. The truckbed apparatus 10 includes a framework of support rails coupled to the bed rails of a pickup truck and a pair of door assemblies coupled to the framework.

Figure 1A:
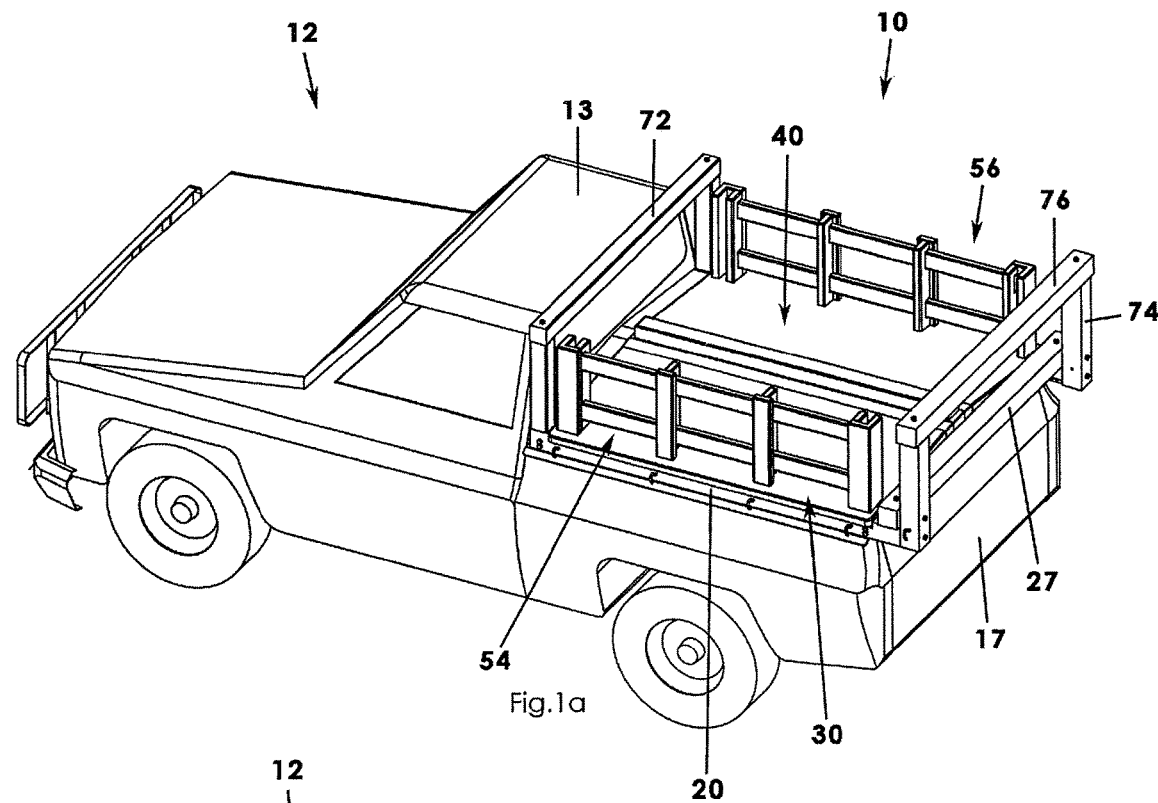
FIG. 1a is a perspective view of a truckbed cover apparatus according to the present invention, illustrated mounted to the bed of a pickup truck having a tailgate in a closed configuration.
Figure 1B:
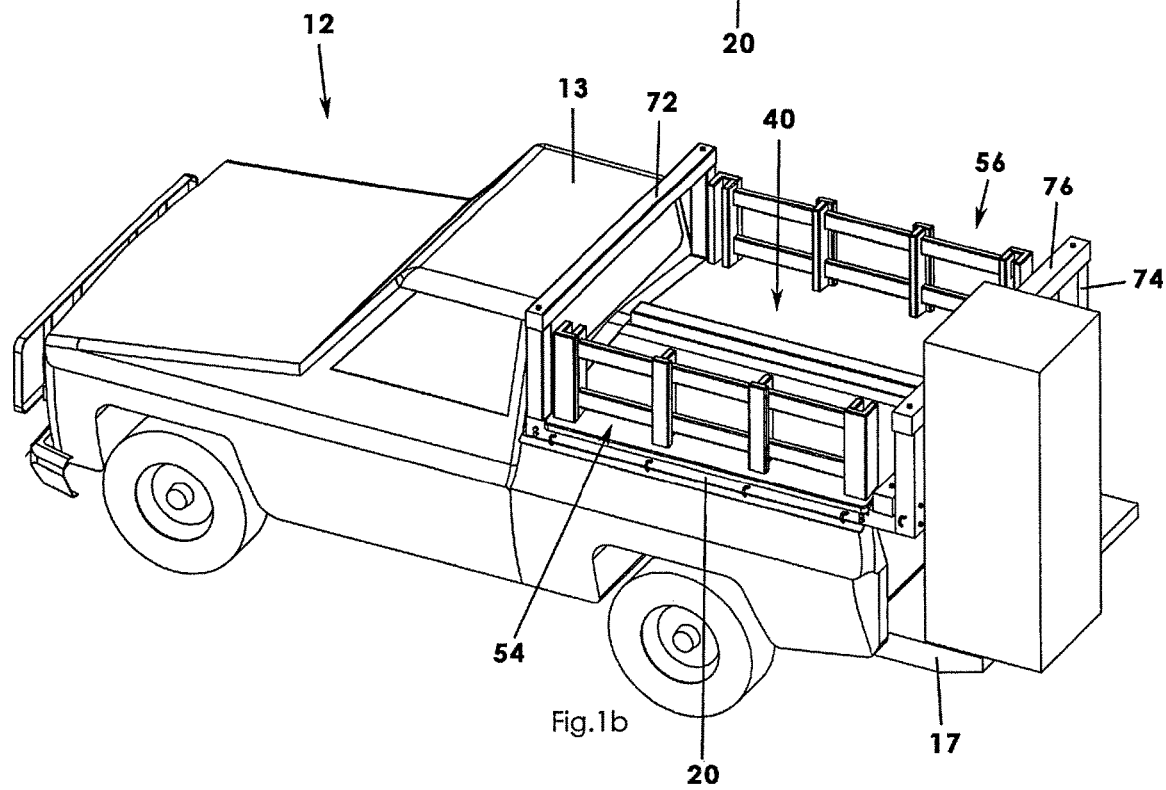
FIG. 1b is a perspective view of the truckbed cover apparatus as in FIG. 1a, illustrated with the tailgate in an open configuration and supporting cargo.
Figure 1C:
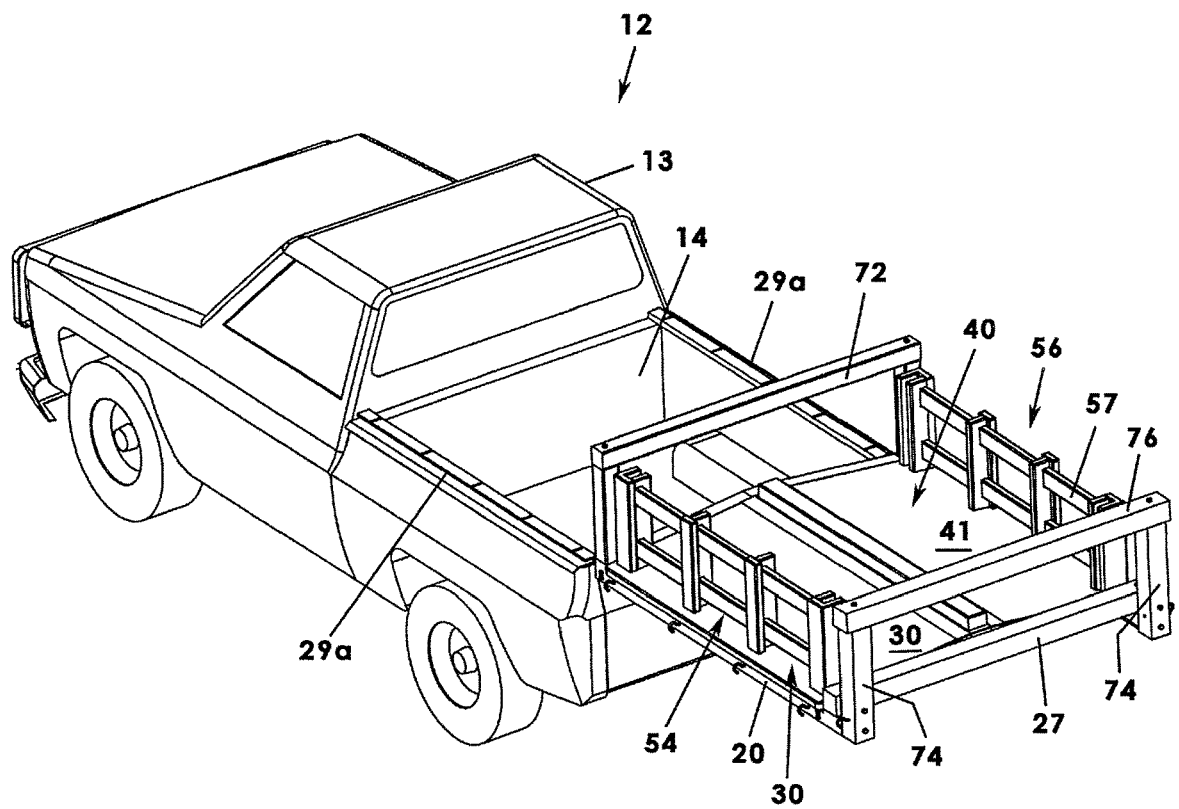
FIG. 1c is a partially exploded view of the truckbed cover apparatus as in FIG. 1a, illustrating the mounting onto the bed portion of a pickup truck.
Figure 1D:
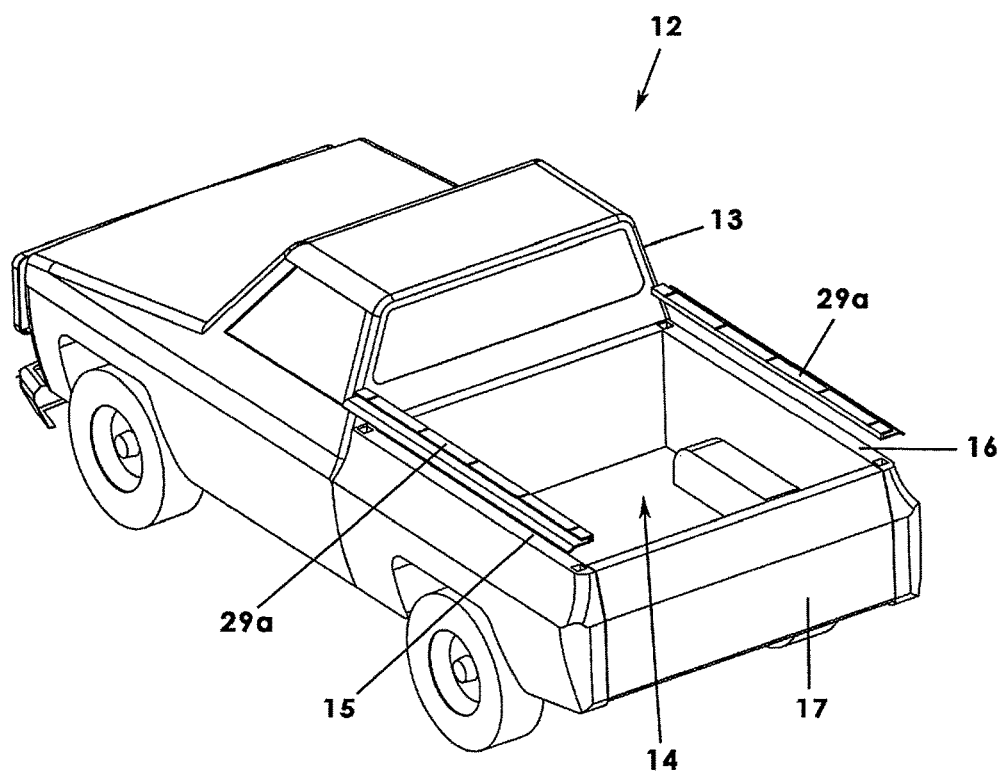
FIG. 1d is another partially exploded view of the truckbed cover apparatus as in FIG. 1c from another angle.

The truckbed apparatus 10 is intended to be mounted to a pickup truck 12 of a type having a bed portion 14 that includes spaced apart and longitudinally extending first and second bed rails 15, 16 and a tailgate 17 that moves pivotally between open and closed configurations. The truckbed apparatus 10 is shown mounted to a pickup truck 12 in FIGS. 1a and 1b with FIG. 1b illustrating the tailgate 17 in a down configuration for support a load of cargo.

Figure 3A:
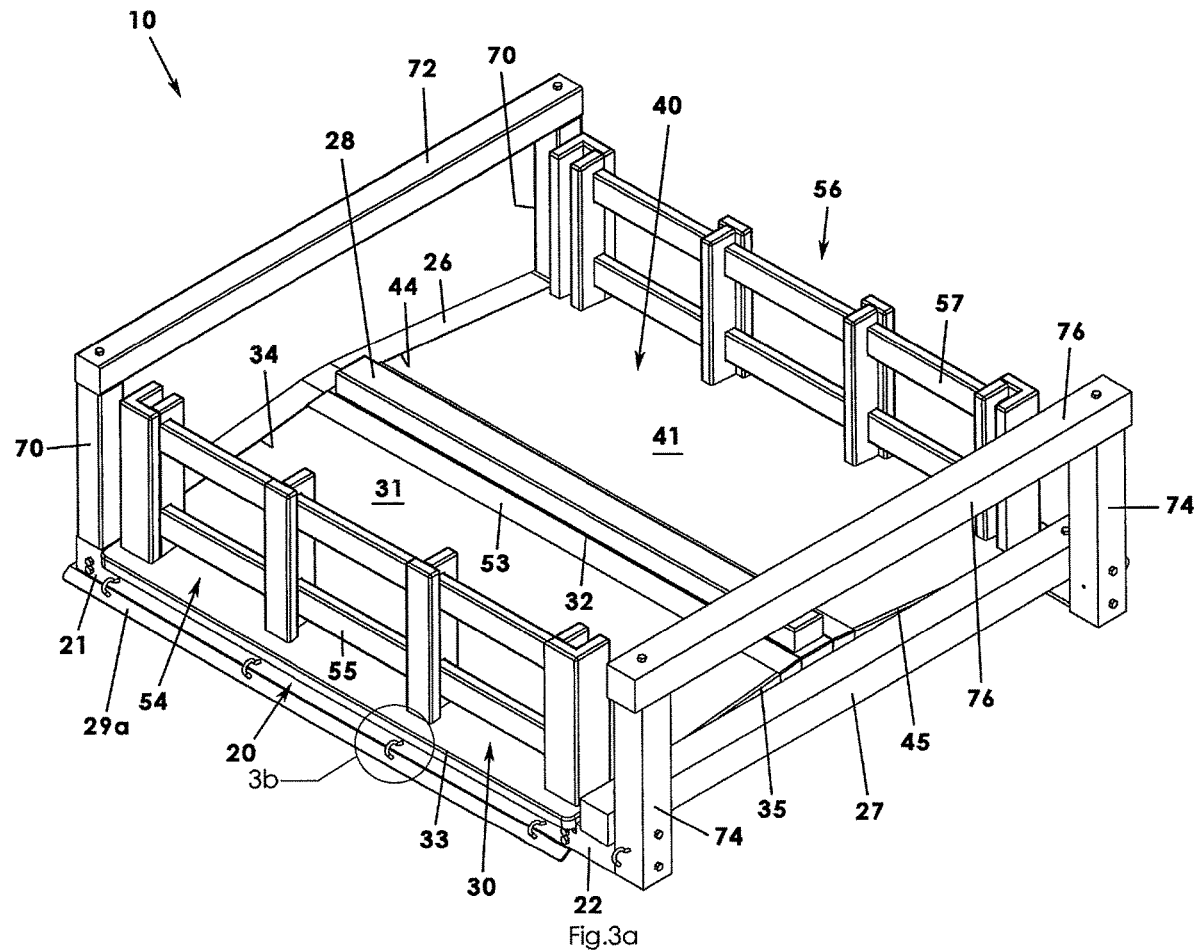
FIG. 3a is a perspective view of the truckbed cover apparatus as in FIG. 1a, illustrated removed from the truckbed.
Figure 6A:
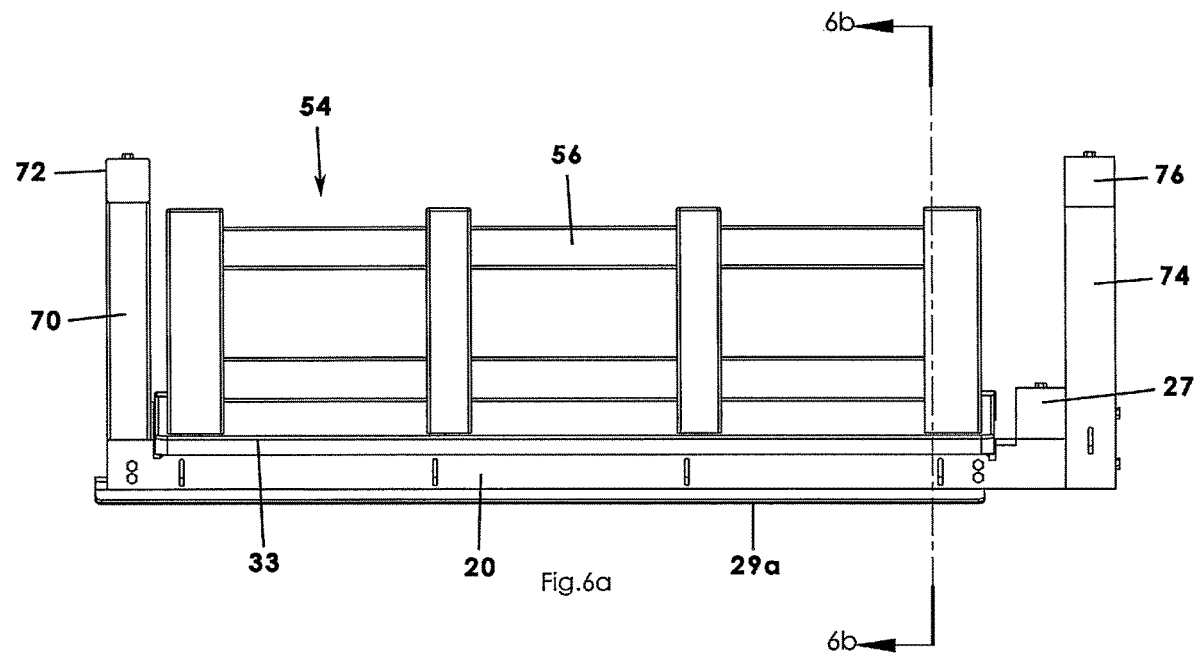
Figure 6B:
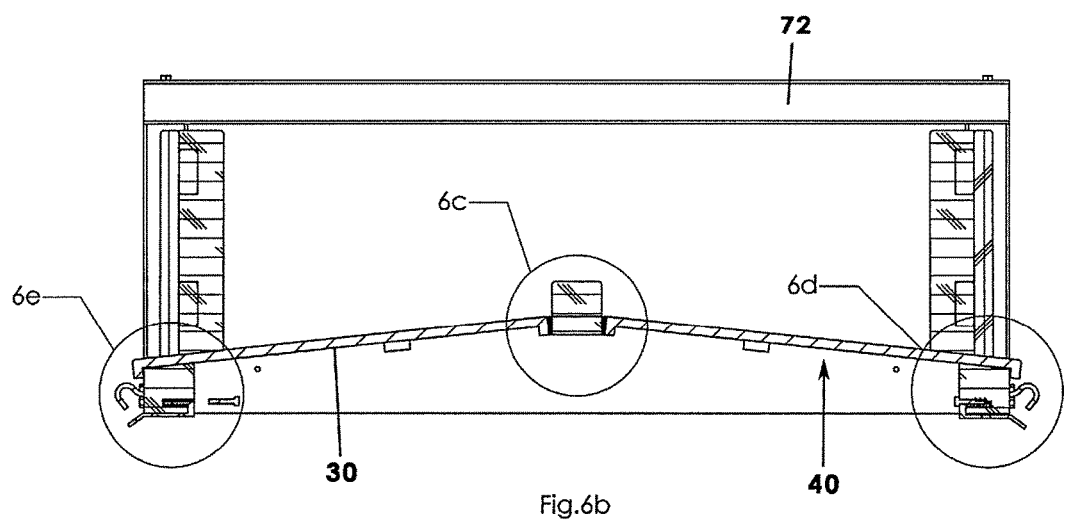
Figure 6C:
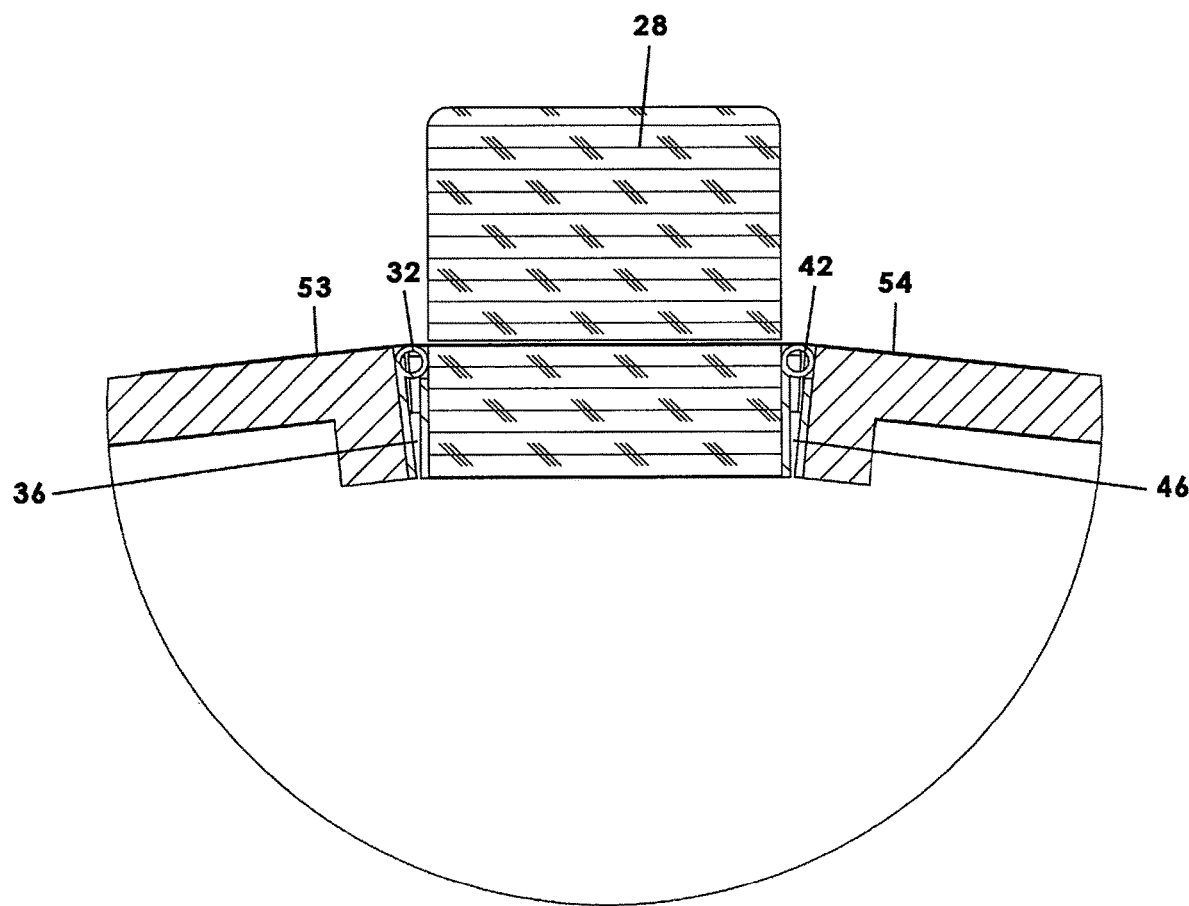
FIG. 6c is an isolated view on an enlarged scale taken from FIG. 6b.
Figure 6D:
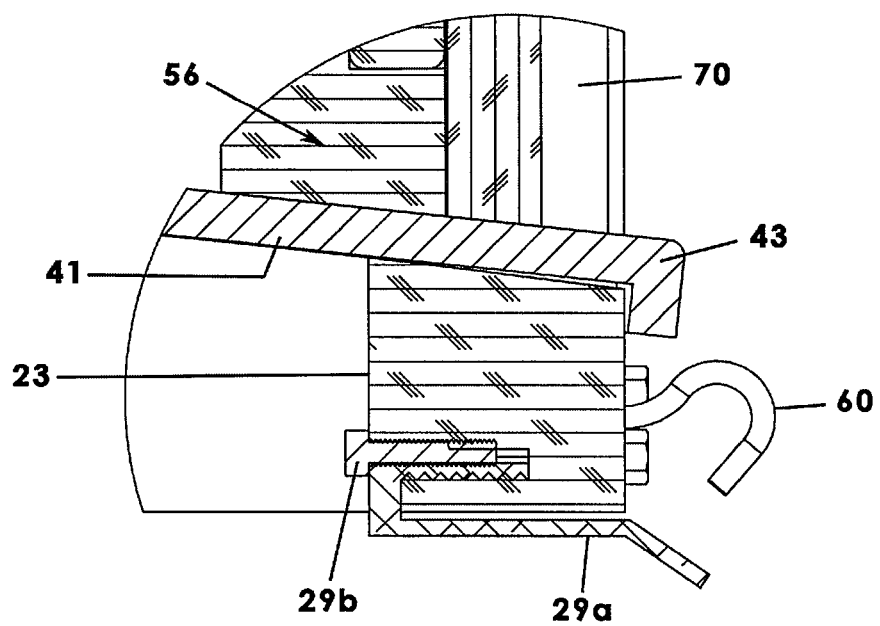
FIG. 6d is an isolated view on an enlarged scale taken from FIG. 6b.
Figure 6E:
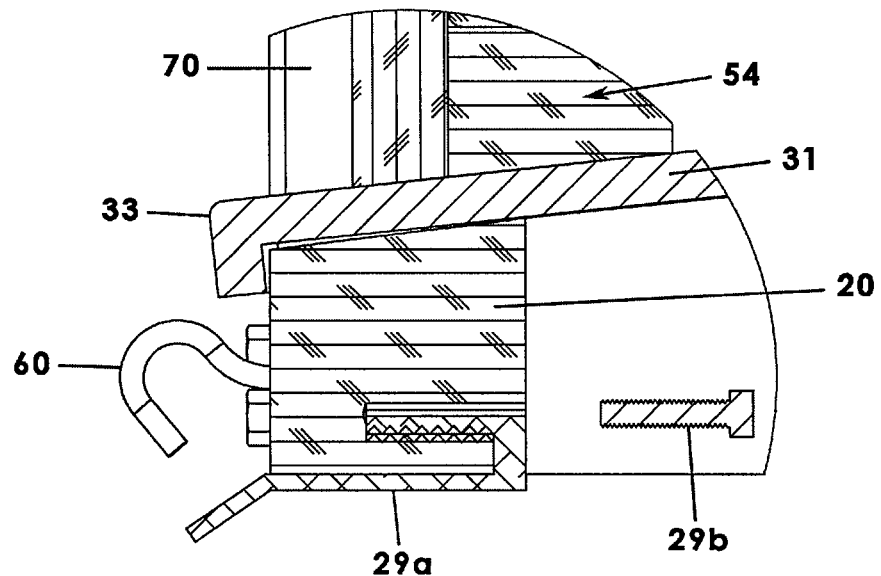
FIG. 6e is an isolated view on an enlarged scale taken from FIG. 6b.

As best shown in FIG. 3, the truckbed apparatus 10 includes a framework for mounting the apparatus to the bed portion 14. More particularly, the framework includes a first side cover rail 20 that is operatively coupled to the first bed rail 15 of the bed portion 14 of the pickup truck 12. In like manner, the framework includes a second side cover rail 23 that is operatively coupled to the second bed rail 16 of the bed portion 14 of the pickup truck 12. It will be noted that the first and second side cover rails 20, 23 extend along the entire length of the first and second bed rails 15, 16 of the bed portion 14. Further, each side cover rail includes a proximal end 21, 24, respectively, adjacent a front end of the bed portion 14, i.e. adjacent a cab portion 13 of the pickup truck. Still further, each side cover rail includes a distal end 22, 25 adjacent a rear end of the bed portion, i.e. adjacent the tailgate 17 of the bed portion 14 of the pickup truck 12. In other words, the present invention is distinguished over traditional truckbed toolboxes positioned adjacent the cab portion 13 of a pickup truck 12. It is understood that respective left and right side cover rails 20, 23 may be mounted to respective bed rails 15, 16 of a truck by first being mounted to respective bed rail plates 29a with a bolt 29b or similar fasteners (FIGS. 6d and 6e). The framework also includes a front end cover rail 26 coupled to and extending between the proximal ends 21, 24 of the first and second side cover rails 20, 23. In like manner, the framework also includes a rear end cover rail 27 coupled to and extending between the distal ends 22, 25 of the first and second side cover rails 20, 23.

Still further, the framework includes a center support rail 28 that is generally parallel to and intermediate the first side cover rail 20 and second side cover rail 23. In other words, the center support rail 28 may be operatively coupled to and extend between center portions of the front end cover rail 26 and rear end cover rail 27 described above (FIG. 3).

In another aspect, the truckbed cover apparatus 10 includes a first door assembly 30 and a second door assembly 40 pivotally coupled to opposed side edges of the center support rail 28. More particularly, the first door assembly 30 may include a first door 31 having a first inner edge 32 pivotally coupled to a corresponding side of the center support rail 28, such as with a first hinge 36, and includes a first outer edge 33 opposite the first inner edge 32. The first door 31 is pivotally movable between a closed configuration in which the first outer edge 33 bears against or lays atop the first side cover rail 20 and an open configuration at which the first outer edge 33 is displaced upwardly and away from the first side cover rail 20. In other words, cargo may be inserted into an open space of the bed portion 14 when the first door 31 is moved to the open configuration but the open space is not accessible when the first door 31 is at the closed configuration. With further detail, the first door 31 includes a front lateral edge 34 that is positioned adjacent the front end cover rail 26 and includes a rear lateral edge 35 positioned adjacent the rear end cover rail 27 when at the closed configuration. In an important aspect, the first door 31, when positioned at the closed configuration, slopes downwardly from the first inner edge 32 toward the first outer edge 33 so that rain is directed or repelled over the side of the pickup truck 12.

Similarly, the second door assembly 40 may include a second door 41 having a second inner edge 42 pivotally coupled to a corresponding side of the center support rail 28, such as with a second hinge 46, and includes a second outer edge 43 opposite the second inner edge 42. The second door 41 is pivotally movable between a closed configuration in which the second outer edge 43 bears against or lays atop the second side cover rail 23 and an open configuration at which the second outer edge 43 is displaced upwardly and away from the second side cover rail 23. In other words, cargo may be inserted into an open space of the bed portion 14 when the second door 41 is moved to the open configuration but the open space is not accessible when the second door 41 is at the closed configuration. In further detail, the second door 41 includes a front lateral edge 44 that is positioned adjacent the front end cover rail 26 and includes a rear lateral edge 45 positioned adjacent the rear end cover rail 27 when at the closed configuration. In an important aspect, the second door 41, when positioned at the closed configuration, slopes downwardly from the second inner edge 42 toward the first outer edge 43 so that rain is directed or repelled over the side of the pickup truck 12.

In a related aspect, each door assembly includes a gas strut to deploy to assist in opening a respective door and then to hold it open until nominal pulling force causes it to contract back to a closed configuration. More particularly, a first gas strut 50 is coupled to a bottom side of the first door 31 and configured to raise the first door 31 when actuated. Similarly, a second gas strut 52 is coupled to a bottom side of the second door 41 and configured to raise the second door 41 when actuated. It is understood that each door may include one, two, or more struts (as shown) by which to make opening and closing respective doors smoothly and virtually effortlessly.

It will be understood that cargo may be loaded and situated directly atop the first door 31 and second door 41 when respective doors are at their closed configurations. In other words, each door is constructed of a material that is sufficiently strong and durable to support both light cargo and heavy cargo, e.g. cargo in the nature of a refrigerator, yard waste, or other cargo having an irregular shape not otherwise supportable by the other structures of the invention. This is another reason why respective doors extend substantially completely the length of the bed of the truck, i.e. so miscellaneous cargo may be piled atop the doors and supported when said miscellaneous sized cargo would not be supported atop any other structures.

In another related aspect, each door assembly includes a weather seal material positioned proximate the junction between a respective inner edge and the center support rail 28 for preventing moisture from gaining access to cargo stored in the interior space beneath a respective door and also to protect a respective hinge. In fact, the weather seal may be referred to as a tarp-style hinge weather seal. More particularly, the first door assembly 30 may include a first weather seal 53 adjacent to and extending along the first inner edge 32 of the first door 31 (FIGS. 6*b* and 6*c*). In like manner, the second door assembly 40 may include a second weather seal 54 adjacent to and extending along the second inner edge 42 of the second door 41.

Still further, the first door assembly 30 includes a first containment assembly 54 extending upwardly from a top surface of said first door 31, the first containment assembly being positioned adjacent the first outer edge 33. The first containment assembly 54 includes an array of first support rails 55 and may have the appearance of a fence and a configuration suitable for containing cargo. Similarly, the second door assembly 40 includes a second containment assembly 56 extending upwardly from a top surface of said second door 41, the second containment assembly being positioned adjacent the second outer edge 43. The second containment assembly 56 includes an array of second support rails 57 and may have the appearance of a fence and a configuration suitable for containing cargo.

Figure 3B:
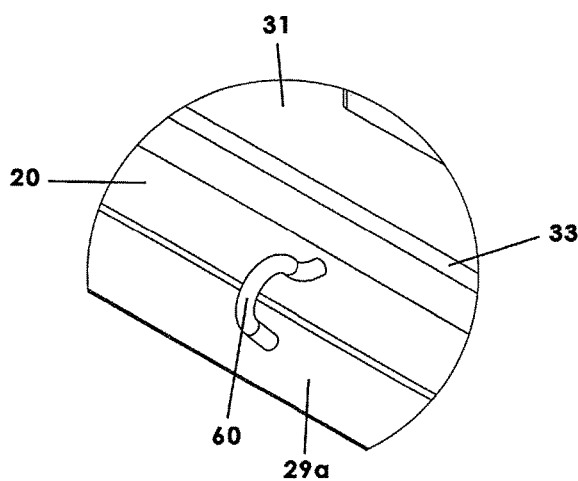
Figure 4:
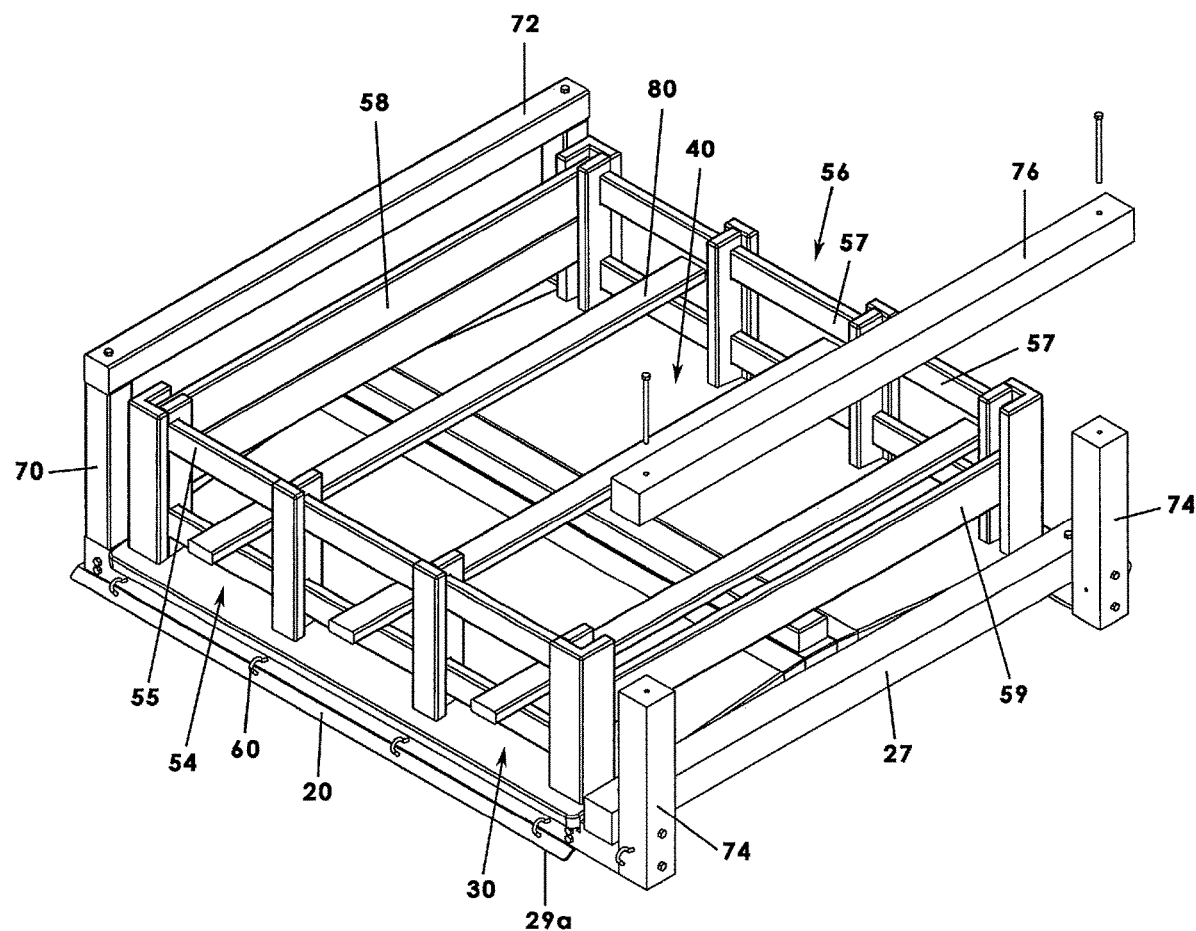
FIG. 4 is a perspective view of the truckbed cover apparatus as in FIG. 3a illustrated with the rear load assembly partially exploded and with a plurality of load bars deployed for holding cargo above pivoting doors according to the present invention.
Figure 5:
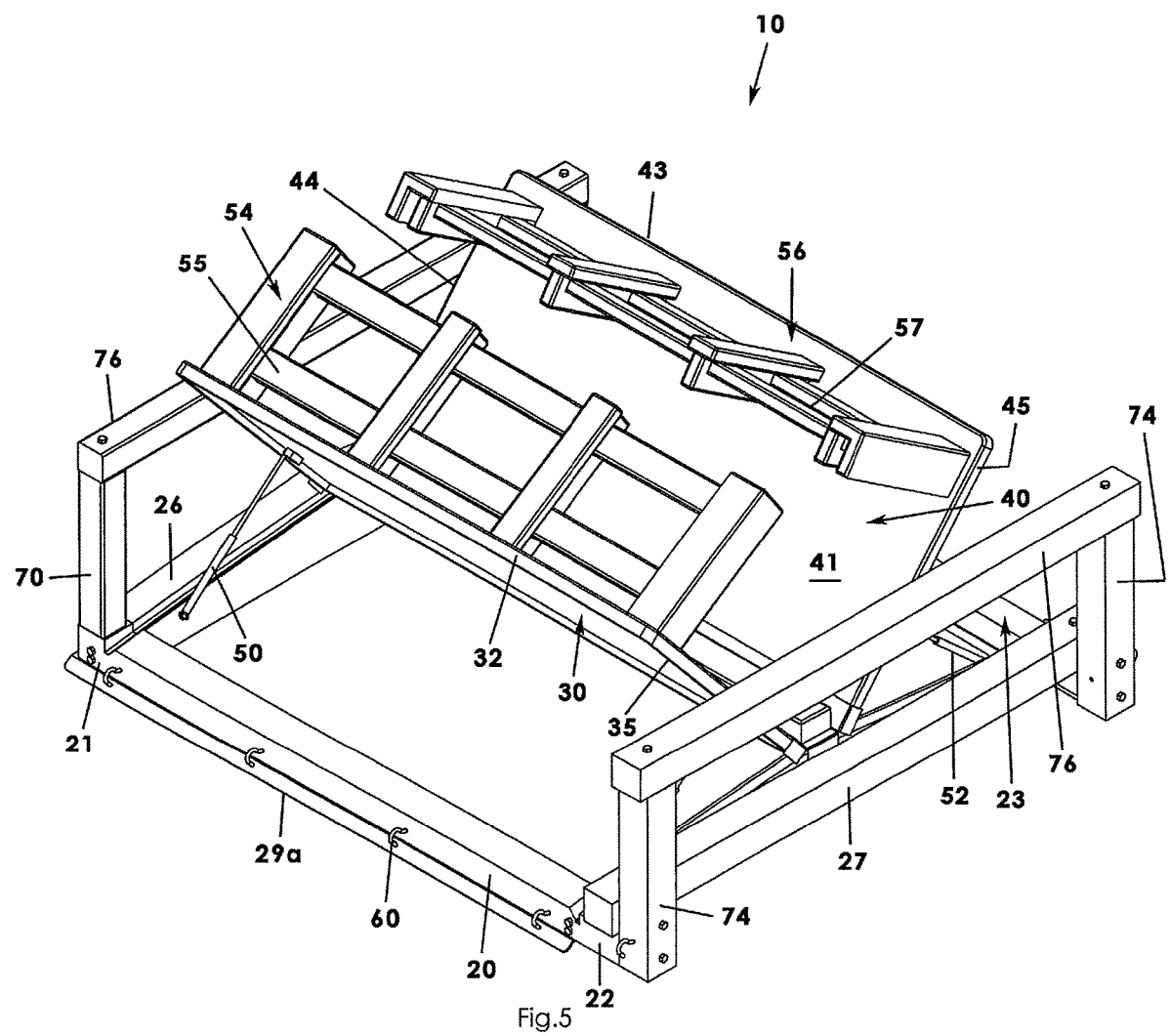
FIG. 5 is a perspective view of the truckbed cover apparatus as in FIG. 3a, illustrated with the pivotal first and second door assemblies in raised or open configurations, respectively.

In another aspect, a plurality of hook fasteners 60 are coupled to the first side cover rail 20 and to the second side cover rail 23 and are spaced apart along the longitudinal length of each one (FIGS. 3*b* and 6*d*). It will be understood that the plurality of hook fasteners 60 are useful for securing ropes and load straps.

In another aspect beneficial to carrying cargo, the truckbed cover apparatus 10 includes a front load assembly 40 having a pair of front extension struts 70 coupled to and extending upwardly from respective proximal ends of said first and second cover side rails 20, 23, respectively. Further, the front load assembly includes a front load bar 72 extending between upper ends of said pair of front extension struts 70. Similarly, the truckbed cover apparatus 10 includes a rear load assembly having a pair of rear extension struts 74 coupled to and extending upwardly from respective distal ends of said first and second cover side rails 20, 23, respectively. Further, the rear load assembly includes a rear load bar 76 extending between upper ends of said pair of rear extension struts 74. It will be understood that respective load bars may be removably attached, such as with a bolt or similar faster, the load bars being useful for some loads and not for others. Preferably, the load bars are positioned in a horizontal plane higher than the roof of the cab of the pickup truck 12 and useful for carrying cargo such as ladders, long boards, and the like. Preferably, the front load bar 72 and rear load bar 76 are positioned at an equal height, e.g. in the same horizontal plane, so that any load placed thereon is level.

Figure 2A:
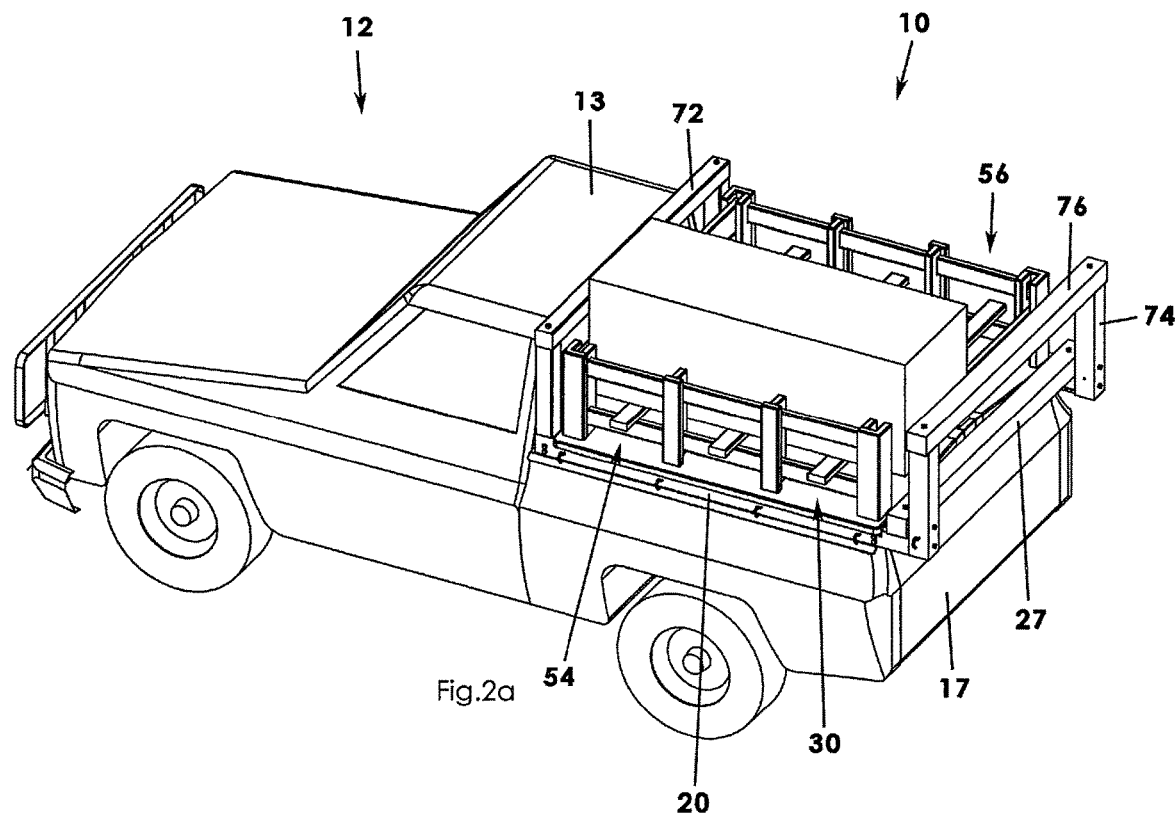
FIG. 2a is another perspective view of the truckbed cover apparatus as in FIG. 1a, illustrated supporting cargo atop a door assembly according to the present invention.
Figure 2B:
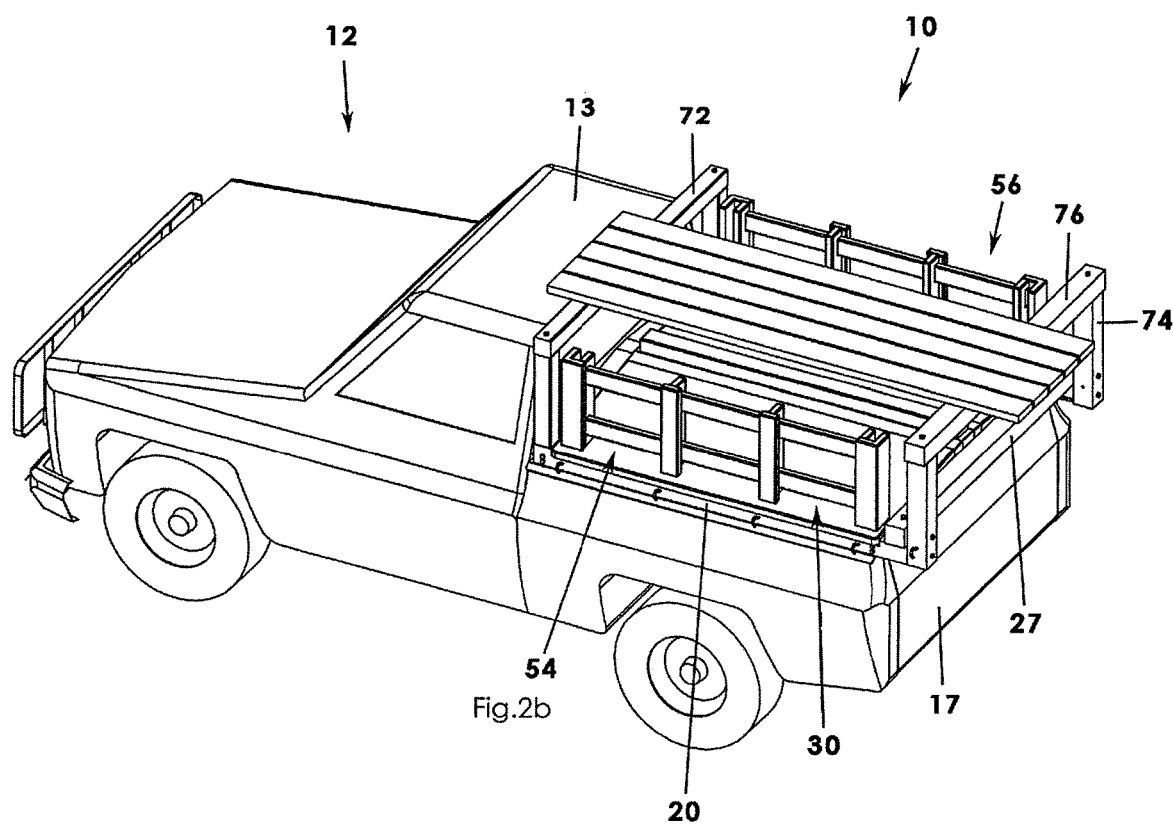
FIG. 2b is another perspective view of the truckbed cover apparatus as in FIG. 1a, illustrated supporting cargo atop front and rear load assemblies according to the present invention.

In addition, the truckbed cover apparatus 10 may include a plurality of cross load bars 80 (FIG. 4), each cross load bar 80 having a first end in communication with the first containment assembly 54 (such as resting atop a rail associated with the first containment assembly 54) and a second end in communication with said second containment assembly 56 (such as resting atop a rail associated with the second containment assembly 56). Each cross load bar 80 has a linear configuration and extends between said first and second containment assemblies, respectively. Further, each cross load bar 80 is spaced apart longitudinally from an adjacent cross load bar. Each cross load bar 80 may be positioned to lay loose upon respective support rails of respective arrays as described above. It is understood that adjacent cross load bars 80 will have the same height (e.g. are part of the same horizontal plane). Cargo may be loaded atop respective cross bars 80 (FIG. 2*a*). Further, the containment assemblies described above may be expanded to operate in conjunction with the cross load bars 80 and to prevent any longitudinal shifting of cargo positioned thereon. More particularly, a front load stop member 58 extends between forward ends of the first 54 and second 56 containment assemblies and a rear load stop member 59 extends between rearward ends of the first 54 and second 56 containment assemblies. It is understood that a load stop member may include one or more boards, panels, rods, or the like that are configured to stop a load of cargo positioned atop respective cross load bars from shifting or sliding forward or backward thereon.

In use, the truckbed cover apparatus 10 provides truck owners with an improved means for carrying cargo between two points and for actually covering and protecting sensitive cargo from weather events.

It is understood that while certain forms of this invention have been illustrated and described, it is not limited thereto except insofar as such limitations are included in the following claims and allowable functional equivalents thereof.

The invention claimed is:

1. A truckbed cover apparatus for attachment to a pickup truck having a bed portion with first and second laterally spaced apart and parallel bed rails, said truckbed cover apparatus comprising:
    a framework that includes:
        a first side cover rail operatively coupled to the first bed rail of the pickup truck, said first side cover rail having a proximal end proximate a cab of the pickup truck and a distal end displaced from the cab of the pickup truck;
        a second side cover rail operatively coupled to the second bed rail of the pickup truck, said second side cover rail having a proximal end proximate a cab of the pickup truck and a distal end displaced from the cab of the pickup truck;
        a front end cover rail coupled to and extending between proximal ends of said first and second side cover rails, respectively;
        a rear end cover rail coupled to and extending between distal ends of said first and second side cover rails, respectively;
        a center support rail having front and rear ends operatively attached to center portions of said front and rear cover rails, respectively, said center support rail being parallel and intermediate to said first and second side cover rails, respectively;
    a first door assembly that includes a first door having a first inner edge pivotally coupled to said center support rail and a first outer edge opposite said first inner edge, said first door being movable between a closed configuration in which said first outer edge bears against said first side cover rail and an open configuration in which said first outer edge is displaced upwardly from said first side cover rail;

wherein said first door has a front lateral edge positioned adjacent said front cover rail and a rear lateral edge positioned adjacent said rear cover rail;

a second door assembly that includes a second door having a second inner edge pivotally coupled to said center support rail and a second outer edge opposite said second inner edge, said second door being movable between a closed configuration in which said second outer edge bears against said second side rail and an open configuration in which said second outer edge is displaced upwardly from said second side member;

wherein said first door assembly includes a first containment assembly extending upwardly from a top surface of said first door and positioned adjacent said first outer edge, said first containment assembly having an array of first support rails;

wherein said second door assembly includes a second containment assembly extending upwardly from a top surface of said second door and positioned adjacent said second outer edge, said second containment assembly having an array of second support rails;

a plurality of cross load bars, each cross load bar having a first end in communication with said first containment assembly and a second end in communication with said second containment assembly;

wherein said each cross load bar has a linear configuration and extends between said first and second containment assemblies, respectively wherein said each cross load bar is spaced apart longitudinally from an adjacent said cross load bar.

2. The truckbed cover apparatus as in claim 1, wherein:
said first side cover rail extending longitudinally along an entire length of the first bed rail and constructed of a material capable of supporting a load of cargo;
said second side cover rail extending longitudinally along an entire length of the second bed rail and constructed of a material capable of supporting a load of cargo.

3. The truckbed cover apparatus as in claim 1, further comprising a plurality of hook fasteners coupled to and spaced apart along said first side cover rail and said second side cover rail, respectively.

4. The truckbed cover apparatus as in claim 1, further comprising:
a front load assembly having a pair of front extension struts coupled to and extending upwardly from said proximal ends of said first and second cover side rails, respectively, said front load assembly having a front load bar extending between upper ends of said pair of front extension struts;
a rear load assembly having a pair of rear extension struts coupled to and extending upwardly from said distal ends of said first and second cover side rails, respectively, said rear load assembly having a rear load bar extending between upper ends of said pair of rear extension struts.

5. The truckbed cover apparatus as in claim 4, wherein:
said front load bar is removably coupled to said upper ends of said front extension struts; and
said rear load bar is removably coupled to said upper ends of said rear extension struts.

6. The truckbed cover apparatus as in claim 1, further comprising:
a front load stop member extending between front struts of said first and second containment assemblies, respectively;
a rear load stop member extending between rear struts of said first and second containment assemblies, respectively.

7. A truckbed cover apparatus for attachment to a pickup truck having a bed portion with first and second laterally spaced apart and parallel bed rails, said truckbed cover apparatus comprising:
a framework that includes a first side cover rail operatively coupled to the first bed rail of the pickup truck and a second side cover rail operatively coupled to the second bed rail of the pickup truck;
wherein said first side cover rail includes a proximal end proximate a cab of the pickup truck and a distal end opposite said proximal end said first side cover rail;
wherein said second side cover rail includes a proximal end proximate the cab of the pickup truck and a distal end opposite said proximal end of said second side cover rail;
wherein said framework includes a front end cover rail coupled to and extending between proximal ends of said first and second side cover rails, respectively, and a rear end cover rail coupled to and extending between distal ends of said first and second side cover rails, respectively;
wherein said framework includes a center support rail having front and rear ends operatively attached to center portions of said front and rear cover rails, respectively, said center support rail being parallel and intermediate to said first and second side cover rails, respectively;
a first door assembly that includes a first door having a first inner edge pivotally coupled to said center support rail and a first outer edge opposite said first inner edge, said first door being movable between a closed configuration in which said first outer edge bears against said first side rail and an open configuration in which said first outer edge is displaced upwardly from said first side member;
wherein said first door has a front lateral edge positioned adjacent said front cover rail and a rear lateral edge positioned adjacent said rear cover rail; and
a second door assembly that includes a second door having a second inner edge pivotally coupled to said center support rail and a second outer edge opposite said second inner edge, said second door being movable between a closed configuration in which said second outer edge bears against said second side rail and an open configuration in which said second outer edge is displaced upwardly from said second side member;
wherein said second door has a front lateral edge positioned adjacent said front cover rail and a rear lateral edge positioned adjacent said rear cover rail;
wherein said first door slopes downwardly from the first inner edge toward the first outer edge so that, when said first door is positioned at the closed configuration, rain is directed toward said first outer edge;
wherein said second door slopes downwardly from the second inner edge toward the second outer edge so that, when said second door is positioned at the closed configuration, rain is directed toward said second outer edge;
wherein:
said first door assembly includes a first containment assembly extending upwardly from a top surface of said first door and positioned adjacent said first outer edge, said first containment assembly having an array of first support rails;

said second door assembly includes a second containment assembly extending upwardly from a top surface of said second door and positioned adjacent said second outer edge, said second containment assembly having an array of second support rails; and a plurality of cross load bars, each cross load bar having a first end in communication with said first containment assembly and a second end in communication with said second containment assembly;

wherein said each cross load bar has a linear configuration and extends between said first and second containment assemblies, respectively;

wherein said each cross load bar is spaced apart longitudinally from an adjacent said cross load bar.

8. The truckbed cover apparatus as in claim 7, wherein:
said first side cover rail extending longitudinally along an entire length of the first bed rail;
said second side cover rail extending longitudinally along an entire length of the second bed rail.

9. The truckbed cover apparatus as in claim 7, further comprising a plurality of hook fasteners coupled to and spaced apart along said first side cover rail and said second side cover rail, respectively.

10. The truckbed cover apparatus as in claim 7, further comprising:
a front load assembly having a pair of front extension struts coupled to and extending upwardly from said proximal ends of said first and second cover side rails, respectively, said front load assembly having a front load bar extending between upper ends of said pair of front extension struts;
a rear load assembly having a pair of rear extension struts coupled to and extending upwardly from said distal ends of said first and second cover side rails, respectively, said rear load assembly having a rear load bar extending between upper ends of said pair of rear extension struts.

11. The truckbed cover apparatus as in claim 7, wherein:
said front load bar is removably coupled to said upper ends of said front extension struts; and
said rear load bar is removably coupled to said upper ends of said rear extension struts.

12. The truckbed cover apparatus as in claim 7, further comprising:
a front load stop member extending between front struts of said first and second containment assemblies, respectively;
a rear load stop member extending between rear struts of said first and second containment assemblies, respectively.

13. The truckbed cover apparatus as in claim 7, wherein:
said first door assembly includes a first gas strut coupled to a bottom side of said first door and configured to hold said first door in said open configuration when actuated; and
said second door assembly includes a second gas strut coupled to a bottom side of said second door and configured to hold said second door in said open configuration when actuated.

14. The truckbed cover apparatus as in claim 7, wherein:
said first door assembly includes a first weather seal adjacent to and extending along said first inner edge of said first door; and
said first door assembly includes a first weather seal adjacent to and extending along said first inner edge of said first door.

* * * * *